United States Patent [19]

Kim

[11] Patent Number: 5,434,843
[45] Date of Patent: Jul. 18, 1995

[54] PICKUP TURNOVER APPARATUS OF A DISK PLAYER

[75] Inventor: Jung T. Kim, Seoul, Rep. of Korea

[73] Assignee: Daewoo Electronics Co., Ltd., Seoul, Rep. of Korea

[21] Appl. No.: 173,114

[22] Filed: Dec. 27, 1993

[30] Foreign Application Priority Data

Dec. 31, 1992 [KR] Rep. of Korea .............. 92-27168

[51] Int. Cl.6 .......................................... G11B 21/04
[52] U.S. Cl. ............................... 369/249; 369/195; 369/199; 369/219
[58] Field of Search ............ 369/249, 195, 199, 75.2, 369/178, 191, 215, 219

[56] References Cited

U.S. PATENT DOCUMENTS

| | | | |
|---|---|---|---|
| 4,839,881 | 6/1989 | Takahara et al. | 369/75.2 |
| 4,903,140 | 2/1990 | Okamoto et al. | 369/195 |
| 4,953,154 | 8/1990 | Takahara et al. | 369/195 |
| 5,081,618 | 1/1992 | Abe | 369/195 |
| 5,097,465 | 3/1992 | Funabashi et al. | 369/199 |
| 5,172,370 | 12/1992 | Suzuki | 369/199 |
| 5,214,634 | 5/1993 | Maeoka et al. | 369/195 |
| 5,311,497 | 5/1994 | Takizawa et al. | 369/199 |

Primary Examiner—Stuart S. Levy
Assistant Examiner—William R. Korzuch
Attorney, Agent, or Firm—Nixon & Vanderhye

[57] ABSTRACT

A pickup turnove apparatus of a disk player of a new turn-type in which a U-shape shuttle device acting as a pickup turnover means is provided at the rear of a pickup feeding plate of the disk player and turned over from a lower position to an upper position or vice versa with a pickup mounted thereon, thereby to increase the reliability of a turnover operation, to restrict noise occurrence during the turnover operation, and to reduce time required for the turnover operation.

8 Claims, 3 Drawing Sheets

PICKUP TURNOVER APPARATUS OF A DISK PLAYER

BACKGROUND OF THE INVENTION

1. Field of the Invention

This invention relates to a pickup turnover apparatus of a disk player, and more particular to a pickup turnover apparatus of a double-sided reproducing disk player provided at the rear of a pickup feeding plate with a turnover means for mounting thereon a pickup and turning over with the pickup mounted thereon in order to reproduce signals of a double-side disk such as a laser disk, thereby to improve the reliability of a turnover operation and prevent noise from being created during the turnover operation.

2. Description of the Prior Art

Generally, a disk player is used to reproduce a laser disk having signal record layers on the opposite faces thereof as well as a compact disk having a signal record layer on a single face thereof, and when reproducing the double-sided disk, after completion of reading of signals on the lower surface of the disk, a carriage having thereon on optical pickup for reading a signal is turned over by a turnover means in order to read the upper surface of the disk without ejecting a disk tray and reloading the disk on the disk tray.

Such a conventional turnover means may be sorted as a U-turn type one or α-turn one according to the pattern of tunover after completion of a pickup feeding operation. However, the conventional U-turn type turnover means has a problem that when a power is off during the turnover operation, a pickup device is apt to secede from its movement path due to the absence of a suitable structure holding the pickup device, and the α-turn type turnover means also has a problem that since the pickup device is turned over out of teh vicinity of the disk and a trace of the turnover movement is changed suddenly, much noise is occurred during the turnover operation, time necessary for completing the operation is relatively long as compared with that of U-turn type, and a damage to the apparatus is caused by repeated operations of the abrupt change of the movement.

Also, U.S. Pat. Nos. 5,081,618 and 5,097,465 have proposed a construction wherein a planetary gear provided on a carriage is brought into meshing engagement with a sun gear so that it may roll on the sun gear, and a turning member which carries a holding member thereon is turned around a support shaft on a mounting plate so that the carriage is turned over so as to reproduce the upper record surface of the disk.

Above mentioned U.S. Patents, however, have shortcomings that since the planetary gear and the sun gear must be equipped, the construction of the arrangements is complex.

SUMMARY OF THE INVENTION

It is an object of the present invention to provide a pickup turnover apparatus of a disk player of a new turn-type (herein, named as a "S-TURN") in which a U-shaped shuttle device acting as a pickup turnover means is provided at the rear of a pickup feeding plate of the disk player and turned over from a lower position to an upper position or vice versa with a pickup mounted thereon, thereby to increase the reliability of a turnover operation, to restrict noise occurrence during the turnover operation, and to reduce time required for the turnover operation.

In order to accomplish the above objects, a pickup turnover apparatus of a disk player in accordance with the present invention comprises a U-shaped shuttle disposed at the rear of said pickup feeding plate; a second guide means extending from and in a separate relationship with said first guide means within said shuttle; a driving means secured to a carriage which is moved into said shuttle by said second guide means; a gear train for turning over said shuttle from a lower position to an upper position or vice versa by means of a driving force of said driving means; and a support means for rotatably supporting said shuttle and cooperating with said gear train, said turnover means itself turning over with said pickup mounted therein.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENT

Figure 1:
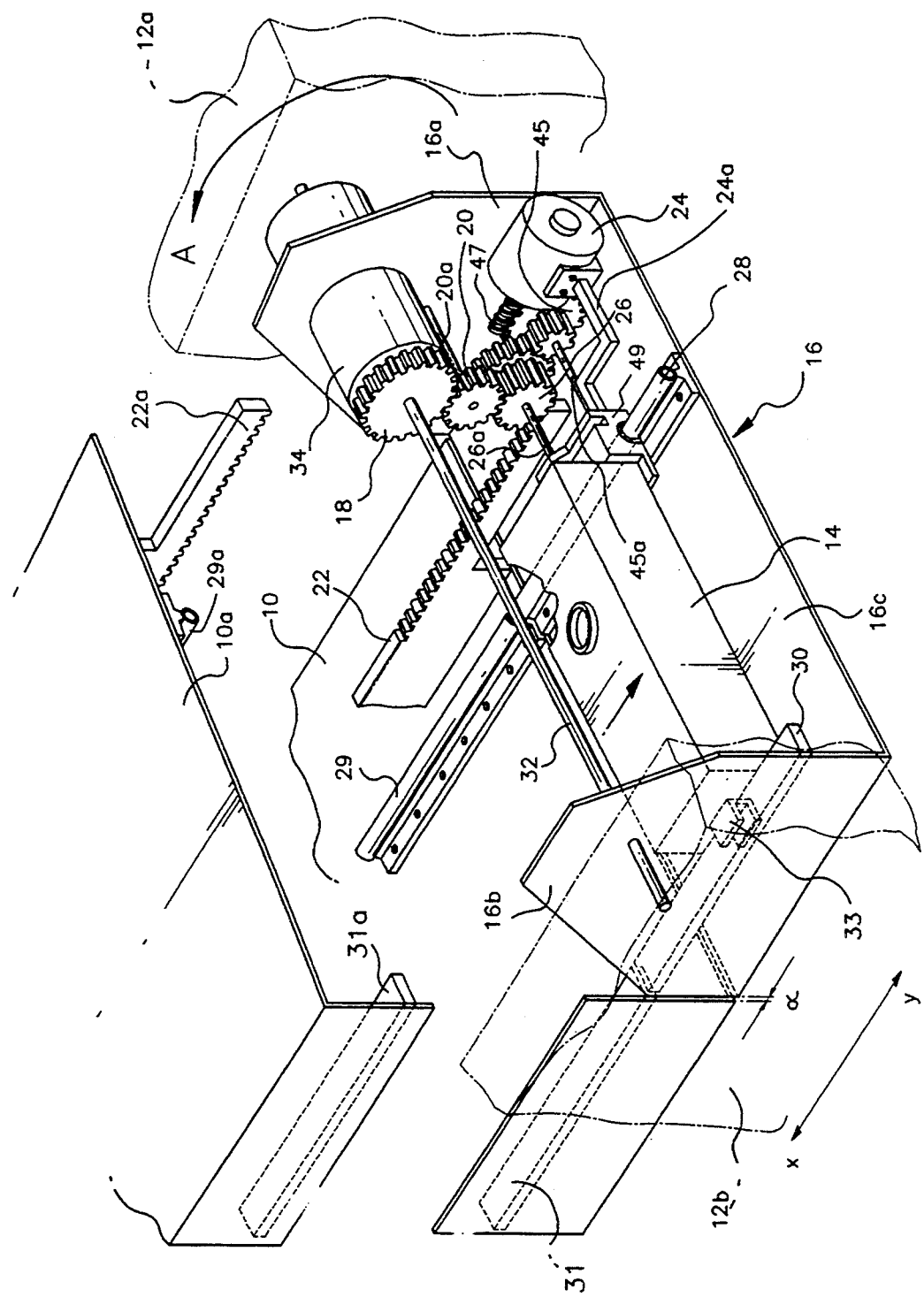
FIG. 1 is a perspective view showing a pickup turnover apparatus according to the present invention.

Referring to FIG. 1 in which an arrow X represents the forward direction of the disk player, and another arrow Y represents the backward direction, a U-shaped shuttle 16 constituting a turnover means for turning over a pickup 14 is provided at the rear of a pickup feeding plate 10 with a gap a, and includes a first vertical portion 16a, a second vertical portion 16b and a horizontal portion 16c. The first vertical portion 16a of the shuttle 16 is rotatably fitted into a circumferential groove 50 of a support member 34 the one end of which is secured to an inner surface of a first frame 12a and the other end of which is operatively cooperated with a turnover gear 18, and the second vertical portion 16b of the shuttle 16 is rotatably mounted on a support shaft 32 which is fixed to said support member 34 at the one end thereof and is fixed to a second frame 12b at the other end thereof, whereby the shuttle 16 can be suspended between a pair of the frames 12a, 12b to be turned over from a lower position to an upper position or vice versa. The turnover gear 18 is rotatably mounted on the support shaft 32 with a gap from the support member 34.

Figure 3:
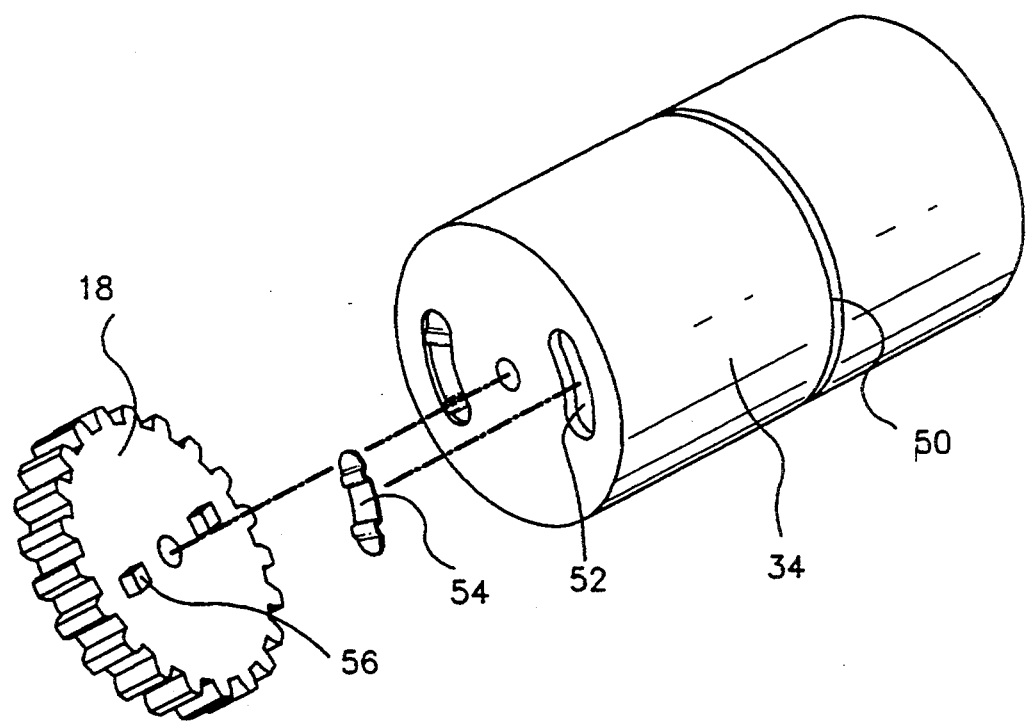
FIG. 3 is an exploded perspective view of a turnover gear and a support member of the turnover apparatus.
Figure 4:
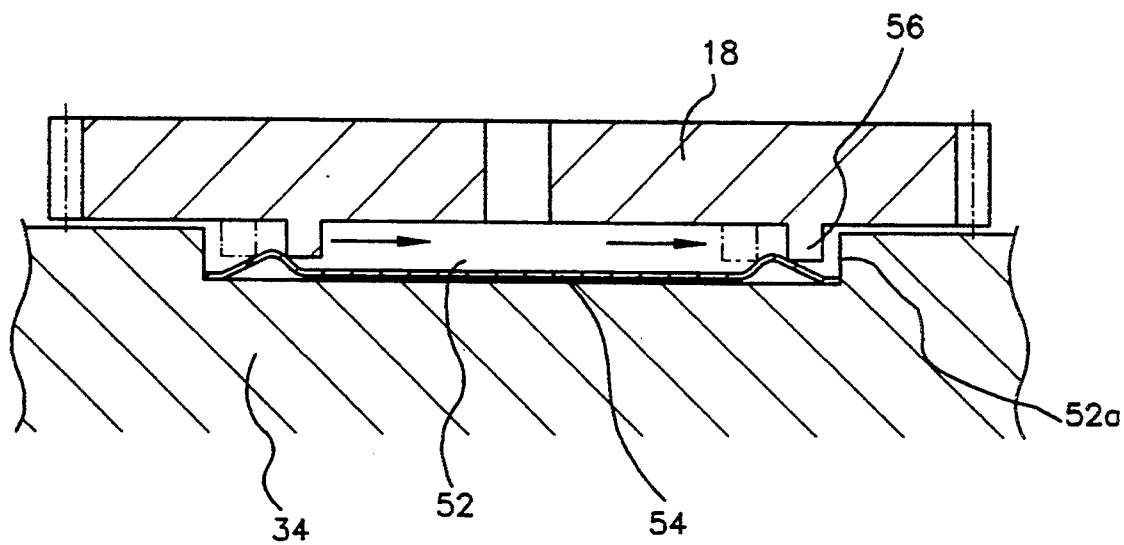
FIG. 4 is a sectional view showing that a protrusion of the turnover gear is operatively cooperated with an arc-type recess formed in the support member.

As shown in FIGS. 3 and 4, a plurality of, preferably, a pair of protrusions 56 is formed on the backside of the turnover gear 18 and a plurality of, preferably, a pair of arc-type recesses 52 into which the protrusion 56 is correspondingly received and in which a spring member 54 is installed are formed on the corresponding surface of the support member 34, thereby to prevent further rotation of the turnover gear 18 in such a manner that the protrusion 56 may be snap-fitted with the spring member 54 and then be abutted with a wall 52a of the recess 52.

Meanwhile, a guide rail 28 is formed on the horizontal portion 16c of the shuttle 16, extending with a gap α from a guide rail 29 formed on a lower pickup feeding plate 10, and a guide rib 30 is formed on the second vertical portion 16b of the shuttle 16, extending with a gap α from a guide rib 31 formed on the inner surface of a vertical poriton of the lower pickup feeding plate 10, whereby the pickup 14 can be further moved to inside of the shuttle 16 along the guide rail 28 and guide rib 30 by means of a carriage 49 and a slider 33 both of which are installed on the opposite surfaces of the pickup 14.

When the shuttle 16 is rotated upwardly as shown by an arrow A in FIG. 1 and then positioned at the rear of an upper pickup feeding plate 10a, the guide rail 28 and the guide rib 30 of the shuttle 16 are in a straight line with a guide rail 29a and a guide rib 31a of the upper pickup feeding plate 10a.

Rack members 22a, 22, each mounted on the respective upper and lower pickup feeding plates 10a, 10, are formed as L-shaped or adverse L-shaped in order not to interfere with the edge of the shuttle 16 during a turnover operation, and each rear end of the rack members 22a, 22 is extended to the vertical center line of a idle gear 20 rotatably mounted on a shaft 20a which is secured to the vertical portion 16a of the shuttle 16 to allow a pickup feeding gear 26 to be meshed with the idle gear 20 upon disengagement of the pickup feeding gear 26 from the rack member 22.

The pickup feeding gear 26 consisting of a large gear portion and a small gear portion and rotatably mounted on a shaft 26a which is secured to the carriage 49 is meshed with the rack member 22 at the one part of the small gear portion thereof and is meshed with the idle gear 20 at the other part of the small gear portion thereof, while the large gear portion thereof is meshed with a small gear portion of a worm wheel 45 mounted on a shaft 45a which is secured to the carriage 49. Furthermore, the one part of the idle gear 20 is meshed with the turnover gear 18 located thereabove while the other part of the idle gear 20 is in mesh with the pickup feeding gear 26 located therebelow.

A driving motor 24 is fixed to the carriage 49 by means of a connecting member 24a, and a worm 47 connected to the driving motor 24 is meshed with a large gear portion of the worm wheel 45.

Hereinafter, an operation of the pickup turnover apparatus according to the present invention is described.

Figure 2:
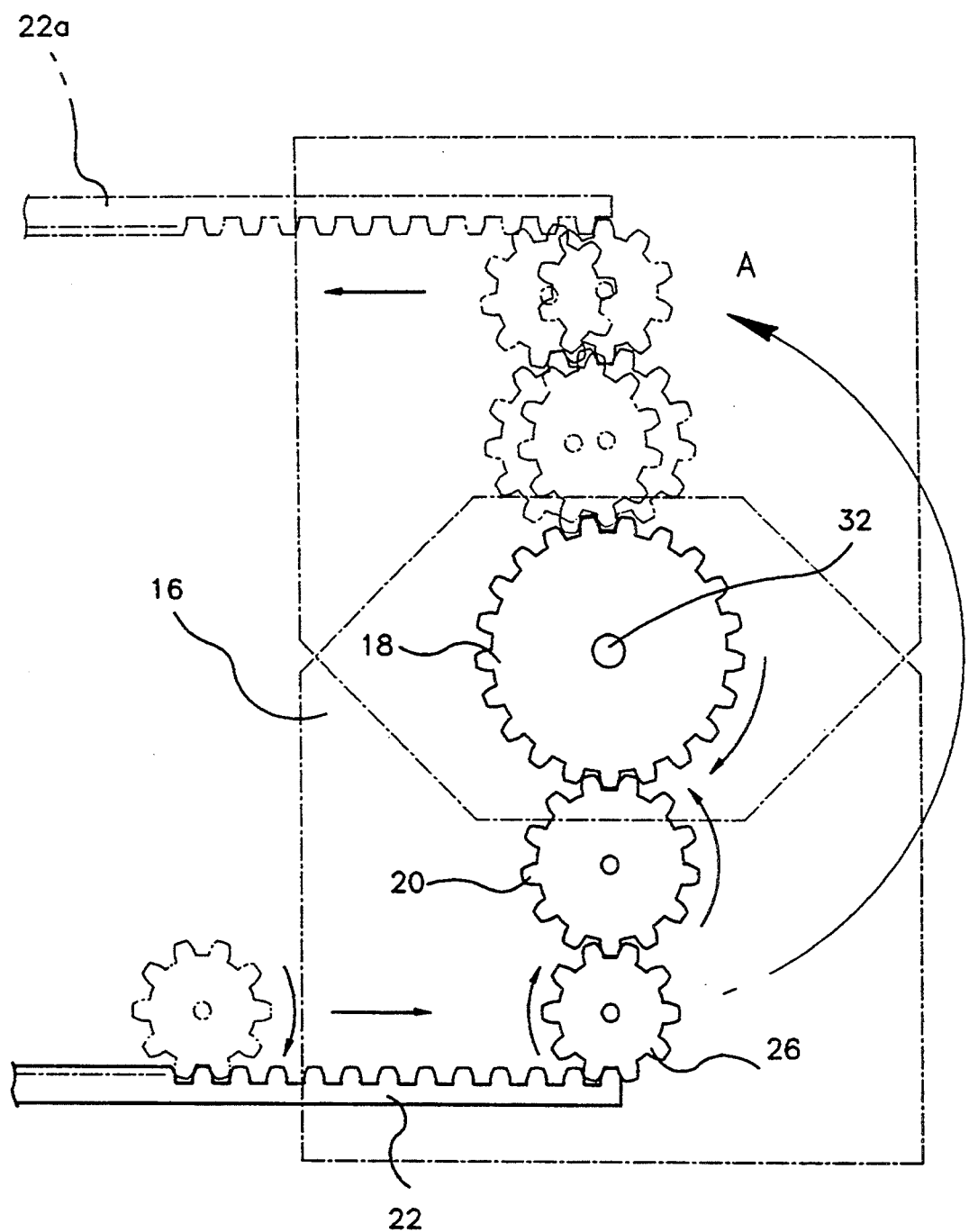
FIG. 2 is an explanatory view showing the operation of a gear mechanism of the pickup turnover apparatus.

As shown in FIGS. 1 & 2, the pickup feeding gear 26 is driven to rotate by the driving motor 24 and moved along the rack member 22 to the inside of the shuttle 16, and thereafter meshed with the idle gear 20 upon its disengagement from the rack member 22. Consequently, a driving force of the driving motor 24 is transmitted to the idle gear 20 and then the idle gear 20 is rotated counterclockwise and the turnover gear 18 is rotated clockwise. Due to such rotation of the turnover gear 18, the protrusion 56 provided on the backside of the turnover gear 18 is accordingly rotated in the recess 52 of the support member 34 and snap-fitted with a projecting portion of the spring member 54 installed within the recess 52, and thereafter abutted with the wall 52a of the recess 52, whereby the turnover gear 18 cannot be rotated further and the reverse rotation of the turnover gear 18 is also prohibited by means of the projecting portion of the spring member 54. Accordingly, the idle gear 20 driven to rotate by the driving motor 24 is rotated to move upwardly along the periphery of the turnover gear 18, and resultingly, shuttle itself mounting thereon the pickup 14 is turned over upwardly around both the support shaft 32 and the support member 34, and pickup feeding gear 26 is meshed with the rear end of the rack member 22a extending backwardly on the upper pickup feeding plate 10a.

Thus, the operation for turning over the pickup is completed.

Meanwhile, it is to be noted that process reverse to that described above proceeds so as to turn over the shuttle 16 from an upper position to a lower position.

Thus, the pickup turnover apparatus in accordance with this invention described above can achieve reliability in turnover operation, restriction in noise-occurrence during the turnover of pickup and attain reduction in time required for turning over the pickup, by adopting a new turn-type of "S-TURN" of the shuttle device.

What is claimed is:

1. A pickup turnover apparatus of a disk player including a turnover means for turning over a pickup which is moved to the rear part of the disk player by a first guide means and a rack member provided on a pickup feeding plate, said turnover means comprising:
    a shuttle disposed at the rear of said pickup feeding plate;
    a second means, within said shuttle, aligned with and said separated by a gap from said first guide means;
    a driving means secured to a carriage which is moved into said shuttle by said second guide means;
    a gear train for turning over said shuttle from a lower position to an upper position or vice versa by means of a driving force of said driving means, said gear train including a worn connected to said driving means, a worm wheel having a small gear portion and a large gear portion meshed with said worm, a pickup feeding gear rotatably mounted on a shaft secured to the carriage and said pickup feeding gear having a large gear portion meshed with the small gear portion of said worm wheel and a small gear portion meshed with the rack member, an idle gear meshed with the small gear portion of said pickup feeding gear and a turnover gear meshed with said idle gear,
    said worm, said worm wheel, said pickup feeding gear, said idle gear and said turnover gear being successively connected to said driving means; and
    a support means for rotatably supporting said shuttle and cooperating with said gear train, said turnover means itself turning over with said pickup mounted thereon.

2. The pickup turnover apparatus according to claim 1, wherein said second guide means are a guide rail and a guide rib.

3. The pickup turnover apparatus according claim 1, wherein said support means comprises:
    a support member which passes through a first vertical portion of said shuttle and is secured to a first frame disposed outside said first vertical portion; and
    a support shaft which passes through a second vertical portion of said shuttle and is secured to a second frame disposed outside said second vertical portion.

4. The pickup turnover apparatus according to claim 3, wherein said turnover gear is provided with a plurality of protrusions, and said support member is provided with a plurality of recesses into which said protrusions are received and in which spring members are installed so as to operatively cooperate with said protrusions, thereby to prevent said turnover gear from being further rotated.

5. The pickup turnover apparatus according to claim 3, wherein said rack member is extended to a vertical center line of said idle gear and is formed as L-shaped or adverse L-shaped.

6. The pickup turnover apparatus according to claim 3, wherein respective shafts of said worm whell and pickup feeding gear are secured to said carriage, a shaft of said idle gear is secured to said first vertical portion of said shuttle, and said turnover gear is rotatably mounted on said support shaft.

7. The pickup turnover apparatus according to claim 1, wherein said shuttle is formed as U-shaped.

8. A double-sided reproducing disk player comprising:
- a pair of pickup feeding plates mounting thereon a first guide means and rack member; and
- a pickup turnover means operatively cooperated with said pickup feeding plates in order to turn over a pickup at the rear of said pickup feeding plates, said turnover means comprising:
- a shuttle disposed at the rear of said pickup feeding plate;
- a second guide means, within said shuttle, aligned with and separated by a gap from said first guide means;
- a driving means secured to a carriage which is moved into said shuttle by said second guide means;
- a gear train for turning over said shuttle from a lower position to an upper position or vice versa by means of a driving force of said driving means,
- said gear train including a worm connected to said driving means, a worm wheel having a small gear portion and a large gear portion meshed with said worm, a pickup feeding gear rotatably mounted on a shaft secured to the carriage and said pickup feeding gear having a large gear portion meshed with the small gear portion of said worm wheel and a small gear portion meshed with the rack member, an idle gear meshed with the small gear portion of said pickup feeding gear and a turnover gear meshed with said idle gear,
- said worm, said worm wheel, said pickup feeding gear, said idle gear and said turnover gear being successively connected to said driving means; and
- a support means for rotatably supporting said shuttle and cooperating with said gear train, said turnover means itself turning over with said pickup mounted thereon.

* * * * *